(12) United States Patent
Maruyama et al.

(10) Patent No.: US 7,630,155 B2
(45) Date of Patent: Dec. 8, 2009

(54) ECCENTRICITY CORRECTION METHOD, SIGNAL PROCESSING CIRCUIT, MAGNETIC STORAGE APPARATUS AND PERPENDICULAR MAGNETIC RECORDING MEDIUM

(75) Inventors: Tsugito Maruyama, Kawasaki (JP); Sumio Kuroda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 442 days.

(21) Appl. No.: 11/474,156

(22) Filed: Jun. 23, 2006

(65) Prior Publication Data
US 2007/0223127 A1   Sep. 27, 2007

(30) Foreign Application Priority Data
Mar. 23, 2006   (JP) ............................. 2006-080580

(51) Int. Cl.
G11B 5/09   (2006.01)
G11B 5/596   (2006.01)

(52) U.S. Cl. ..................... 360/48; 360/51; 360/77.04

(58) Field of Classification Search ................ 360/48, 360/51, 77.04
See application file for complete search history.

(56) References Cited

U.S. PATENT DOCUMENTS

| | | | |
|---|---|---|---|
| 6,791,774 B1 | 9/2004 | Albrecht et al. | |
| 6,963,459 B2 | 11/2005 | Sakai | |
| 7,023,634 B2 | 4/2006 | Takeo | |
| 7,057,834 B2 | 6/2006 | Ishida et al. | |
| 7,061,703 B2 | 6/2006 | Ishida et al. | |
| 7,136,245 B2 | 11/2006 | Mori et al. | |
| 2003/0179481 A1* | 9/2003 | McNeil et al. | ................ 360/48 |

FOREIGN PATENT DOCUMENTS

| | | |
|---|---|---|
| JP | 09-312028 | 12/1997 |
| JP | 10-172156 | 6/1998 |
| JP | 2001-297433 | 10/2001 |
| JP | 2003-45120 | 2/2003 |
| JP | 2003-109317 | 4/2003 |
| JP | 2003-272137 | 9/2003 |
| JP | 2004-342297 | 12/2004 |
| JP | 2005-243160 | 9/2005 |

* cited by examiner

Primary Examiner—Daniell L Negrón
(74) Attorney, Agent, or Firm—Greer, Burns & Crain, Ltd

(57) ABSTRACT

A magnetic storage apparatus has a reproducing head to reproduce information from a perpendicular magnetic recording medium that is recorded with servo information, eccentricity correction data and read/write data. The apparatus further has a filter part to filter a reproduced output of the reproducing head by filtering the servo information which has a differentiated waveform by a non-differentiating characteristic and by filtering the eccentricity correction data and the read/write data which have rectangular waveforms by a differentiating characteristic, a demodulating part to demodulate the servo information, the eccentricity correction data and the read/write data that are filtered by the filter part, and a servo system to carry out a control process including an eccentricity control based on the servo information and the eccentricity correction data that are demodulated.

5 Claims, 13 Drawing Sheets

ECCENTRICITY CORRECTION METHOD, SIGNAL PROCESSING CIRCUIT, MAGNETIC STORAGE APPARATUS AND PERPENDICULAR MAGNETIC RECORDING MEDIUM

BACKGROUND OF THE INVENTION

1. Field of the Invention

The present invention generally relates to eccentricity correction methods, signal processing circuits, magnetic storage apparatuses and perpendicular magnetic recording media, and more particularly to an eccentricity correction method for correcting eccentricity by reproducing an eccentricity correction data that is recorded by a recoding head from a perpendicular magnetic recording medium that is prerecorded with servo information by a magnetic transfer, a signal processing circuit and a magnetic storage apparatus that employ such an eccentricity correction method, and a perpendicular magnetic recording medium that is recorded with an eccentricity correction data in an easily reproducible manner.

2. Description of the Related Art

A magnetic disk is prerecorded with servo information for controlling a position of a head with respect to the magnetic disk. The servo information may be recorded by a recording head or, by a magnetic transfer that applies magnetization in an in-plane direction or a perpendicular direction with respect to the magnetic disk. The magnetic transfer itself is known, as may be seen from a Japanese Laid-Open Patent Application No. 2004-342297.

After the magnetic disk that is prerecorded with the servo information is assembled into a magnetic disk drive, an eccentricity correction data for correcting eccentricity of the magnetic disk is recorded on the magnetic disk by a recording head. The eccentricity correction is carried out in real-time by reproducing the eccentricity correction data from the magnetic disk by a reproducing head.

FIG. 1 is a system block diagram showing an important part of a conventional magnetic disk drive. A magnetic disk drive 1 shown in FIG. 1 includes a preamplifier part 2, a read and write part 3, a hard disk controller (HDD) 4, and a servo controller (SVC) 5. The preamplifier part 2 includes an amplifier 21 and a driver 22. The read and write part 3 includes a synchronizing circuit 31, a prefilter 32, a switching circuit 33, a data demodulating circuit 34, a servo demodulating circuit 35, a post processor 36, a recording compensation circuit 37, and a driver 38.

FIG. 2 is a diagram showing a format on a conventional perpendicular magnetic disk. The perpendicular magnetic disk is provided with a servo region in which servo information is prerecorded by a recording head. Data are recorded in a data region which follows the servo region. A preamble #1, servo mark and address, and servo burst are prerecorded in the servo region. After the perpendicular magnetic disk is assembled into the magnetic disk drive 1, an eccentricity correction data is recorded in the servo region by the recording head subsequent to the servo burst. At the time of a recording, the data is recorded subsequent to a preamble #2. At the time of a reproduction, the recorded data is reproduced from the data region. The data that are reproduced and recorded with respect to the data region are shown as R/W (read/write) data in FIG. 2.

Information reproduced from the perpendicular magnetic disk (not shown) by the reproducing head (not shown) is supplied to the data demodulating circuit 34 and the servo demodulating circuit 35 via the amplifier 21, the synchronizing circuit 31 and the prefilter 32. The synchronizing circuit 31 generates a clock and a servo mark from the reproduced information, and supplies the clock and the servo mark to the switching circuit 33. The switching circuit 33 controls switching of the demodulating circuits 34 and 35 based on the clock and the servo mark, so that the output of the prefilter 32 is demodulated by the servo demodulating circuit 35 while reproducing the information from the servo region and the output of the prefilter 32 is demodulated by the data demodulating circuit 34 while reproducing the information from the data region. Output reproduced data from the data demodulating circuit 34 are supplied to the HDC 4, and output reproduced servo information from the servo demodulating circuit 35 is supplied to the SVC 5. The reproduced data are supplied to other parts within the magnetic disk drive 1 or, output outside the magnetic disk drive 1, via the HDC 4. The reproduced servo information is used for various kinds of control operations of the magnetic disk drive 1 in the SVC 5.

At the time of the recording, the recording data are supplied to the recording head (not shown) via the HDC 4, the post processor 36, the recording compensation circuit 37 and the drivers 38 and 22. Hence the recording head records the recording data within the data region on the perpendicular magnetic disk subsequent to the preamble #2.

According to the format shown in FIG. 2, both the information within the servo region and the information within the data region that are reproduced by the reproducing head are reproduced in the form of a rectangular wave. Hence, the prefilter 32 has a differentiating characteristic.

However, the method of recording the servo information on the magnetic disk by the magnetic transfer is more efficient that the method of recording the servo information by the recording head, in that the servo information can be recorded simultaneously, that is, in a batch. In addition, in the case of the magnetic transfer that applies the magnetization in the in-plane direction with respect to the perpendicular magnetic disk, it is further desirable in that the signal-to-noise ratio (SNR) improves. FIG. 3 is a diagram showing a format on a perpendicular magnetic disk that is recorded with the servo information by the magnetic transfer which applies the magnetization in the in-plane direction with respect to the perpendicular magnetic disk, and is also recorded with the eccentricity correction data by the recording head.

But in the case of the perpendicular magnetic disk that is recorded with the servo information by the magnetic transfer which applies the magnetization in the in-plane direction with respect to the perpendicular magnetic disk and is recorded with the eccentricity correction data by the recording head, the preamble #1, the servo mark and address, and the servo burst that are reproduced by the reproducing head are reproduced in the form of differentiated waveforms and cannot be subjected to the same process as the eccentricity correction data within the servo region and the information within the data region that are reproduced in the form of rectangular waveforms. In other words, if the prefilter 32 has a differentiating characteristic, this prefilter 32 will not be suited for processing the preamble #1, the servo mark and address, and the servo burst within the servo region that are reproduced in the form of differentiated waveforms, and cannot carry out a suitable prefiltering with respect to the servo information that is to be supplied to the servo demodulating circuit 35. On the other hand if the prefilter 32 has a non-differentiating characteristic, this prefilter 32 will not be suited for processing the eccentricity correction data within the servo region and the information within the data region that are reproduced in the form of rectangular waveforms, and cannot carry out a suitable prefiltering with respect to the eccentricity correction data to be supplied to the servo demodulating circuit 35 and the data to be supplied to the data demodulating circuit 34.

For this reason, in the case of the perpendicular magnetic recording medium that is prerecorded with the servo information by the magnetic transfer which applies the magnetization in the in-plane direction with respect to the perpendicular magnetic recording medium, there was a problem in that the eccentricity correction cannot be made by reproducing the eccentricity correction data that has been recorded by the recording head.

SUMMARY OF THE INVENTION

Accordingly, it is a general object of the present invention to provide a novel and useful eccentricity correction method, signal processing circuit, magnetic storage apparatus and perpendicular magnetic recording medium, in which the problems described above are suppressed.

Another and more specific object of the present invention is to provide an eccentricity correction method, a signal processing circuit, a magnetic storage apparatus and a perpendicular magnetic recording medium, which can carry out an eccentricity correction by reproducing an eccentricity correction data that has been recorded by a recording head from a perpendicular magnetic recording medium that is prerecorded with servo information by a magnetic transfer which applies a magnetization in an in-plane direction with respect to the perpendicular magnetic recording medium.

Still another object of the present invention is to provide an eccentricity correction method comprising a reproducing step reproducing information from a perpendicular magnetic recording medium that is recorded with servo information, eccentricity correction data and read/write data, by a reproducing head; a filtering step filtering a reproduced output of the reproducing head, by filtering the servo information which has a differentiated waveform by a non-differentiating filter characteristic, and by filtering the eccentricity correction data and the read/write data which have rectangular waveforms by a differentiating filter characteristic; a demodulating step demodulating the servo information, the eccentricity correction data and the read/write data that are filtered by the filtering step; and an output step outputting the demodulated servo information and eccentricity correction data to a servo system which carries out a control process including an eccentricity correction, and the demodulated read/write data to a data processing system. According to the eccentricity correction method of the present invention, it is possible to carry out an eccentricity correction by reproducing the eccentricity correction data that has been recorded by the recording head from the perpendicular magnetic recording medium that is prerecorded with the servo information by the magnetic transfer which applies the magnetization in the in-plane direction with respect to the perpendicular magnetic recording medium.

A further object of the present invention is to provide a magnetic storage apparatus comprising a reproducing head configured to reproduce information from a perpendicular magnetic recording medium that is recorded with servo information, eccentricity correction data and read/write data; a filter part configured to filter a reproduced output of the reproducing head, by filtering the servo information which has a differentiated waveform by a non-differentiating filter characteristic, and by filtering the eccentricity correction data and the read/write data which have rectangular waveforms by a differentiating filter characteristic; a demodulating part configured to demodulate the servo information, the eccentricity correction data and the read/write data that are filtered by the filter part; a servo system configured to carry out a control process including an eccentricity control based on the servo information and the eccentricity correction data that are demodulated; and a data processing system configured to process the read/write data that are demodulated. According to the magnetic storage apparatus of the present invention, it is possible to carry out an eccentricity correction by reproducing the eccentricity correction data that has been recorded by the recording head from the perpendicular magnetic recording medium that is prerecorded with the servo information by the magnetic transfer which applies the magnetization in the in-plane direction with respect to the perpendicular magnetic recording medium.

Another object of the present invention is to provide a perpendicular magnetic recording medium which is prerecorded with servo information for controlling a position of a head with respect to the perpendicular magnetic recording medium, by a magnetic transfer that applies a magnetization in an in-plane direction with respect to the perpendicular magnetic recording medium, comprising a servo region recorded with a first preamble, the servo information, a second preamble and an eccentricity correction data; and a data region recorded with a third preamble and read/write data, wherein the first, second and third preambles are made up of patterns having a constant period and mutually different frequencies, and the second preamble, the eccentricity correction data, the third preamble and the read/write data are recorded by a recording head. According to the perpendicular magnetic recording medium of the present invention, it is possible to carry out an eccentricity correction by reproducing the eccentricity correction data that has been recorded by the recording head from the perpendicular magnetic recording medium that is prerecorded with the servo information by the magnetic transfer which applies the magnetization in the in-plane direction with respect to the perpendicular magnetic recording medium.

Still another object of the present invention is to provide a perpendicular magnetic recording medium which is prerecorded with servo information for controlling a position of a head with respect to the perpendicular magnetic recording medium, by a magnetic transfer that applies a magnetization in an in-plane direction with respect to the perpendicular magnetic recording medium, comprising a servo region recorded with a first preamble and the servo information; and a data region recorded with a second preamble, an eccentricity correction data and read/write data, wherein the first and second preambles are made up of patterns having a constant period and mutually different frequencies, and the second preamble, the eccentricity correction data, the third preamble and the read/write data are recorded by a recording head. According to the perpendicular magnetic recording medium of the present invention, it is possible to carry out an eccentricity correction by reproducing the eccentricity correction data that has been recorded by the recording head from the perpendicular magnetic recording medium that is prerecorded with the servo information by the magnetic transfer which applies the magnetization in the in-plane direction with respect to the perpendicular magnetic recording medium.

A further object of the present invention is to provide a signal processing circuit comprising a filter part configured to filter a reproduced output of a reproducing head, by filtering servo information which has a differentiated waveform by a non-differentiating filter characteristic, and by filtering an eccentricity correction data and read/write data which have rectangular waveforms by a differentiating filter characteristic; a demodulating part configured to demodulate the servo information, the eccentricity correction data and the read/ write data that are filtered by the filter part; a servo system configured to carry out a control process including an eccentricity control based on the servo information and the eccentricity correction data that are demodulated; and a data processing system configured to process the read/write data that are demodulated. According to the signal processing circuit of the present invention, it is possible to carry out an eccentricity correction by reproducing the eccentricity correction data that has been recorded by the recording head from the recording medium that is prerecorded with the servo information by the magnetic transfer which applies the magnetization in the in-plane direction with respect to the perpendicular magnetic recording medium.

Other objects and further features of the present invention will be apparent from the following detailed description when read in conjunction with the accompanying drawings.

DESCRIPTION OF THE PREFERRED EMBODIMENTS

A description will be given of various embodiments of the eccentricity correction method, the signal processing circuit, the magnetic storage apparatus and the perpendicular magnetic recording medium according to the present invention, by referring to FIG. 4 and the subsequent drawings.

First Embodiment

Figure 1:
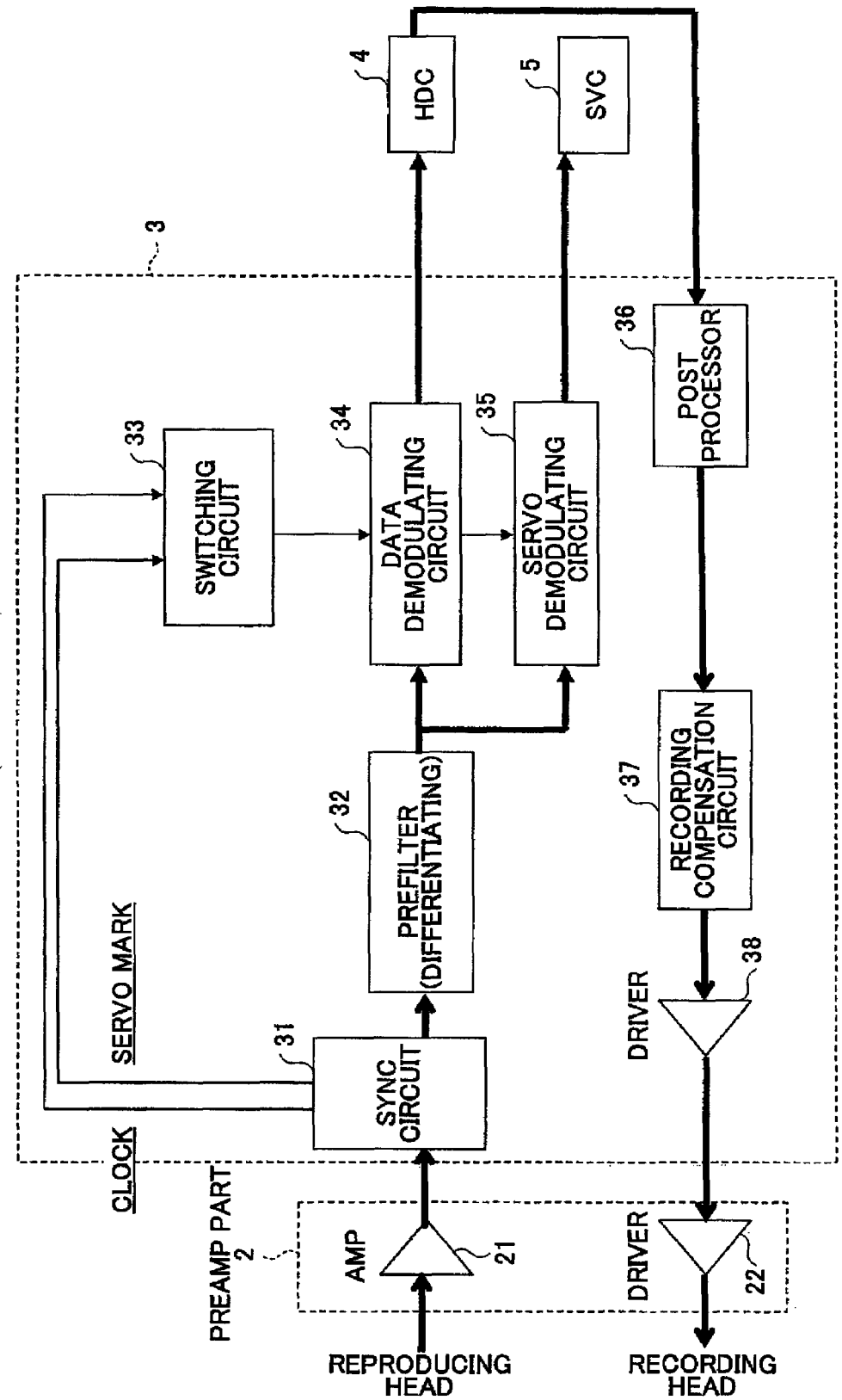
FIG. 1 is a system block diagram showing an important part of a conventional magnetic disk drive.
Figure 2:
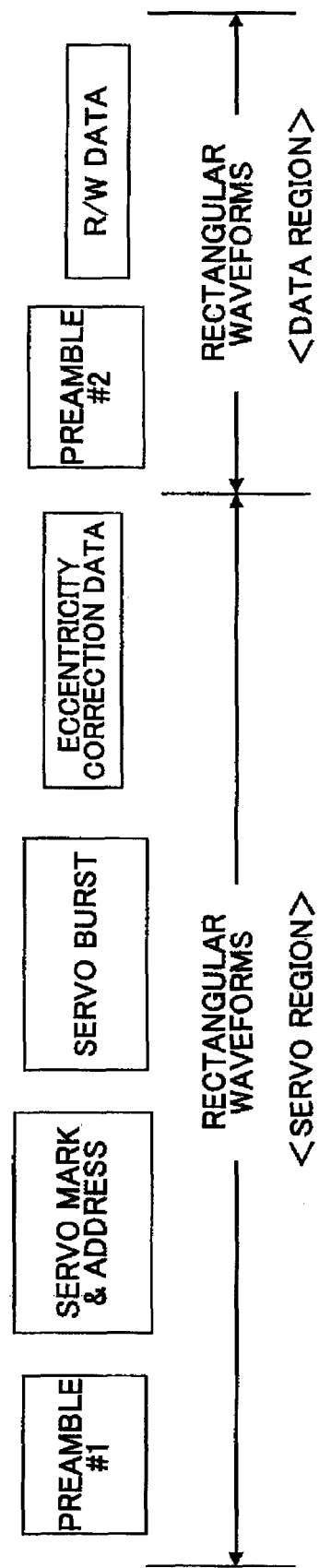
FIG. 2 is a diagram showing a format on a conventional perpendicular magnetic disk.
Figure 3:
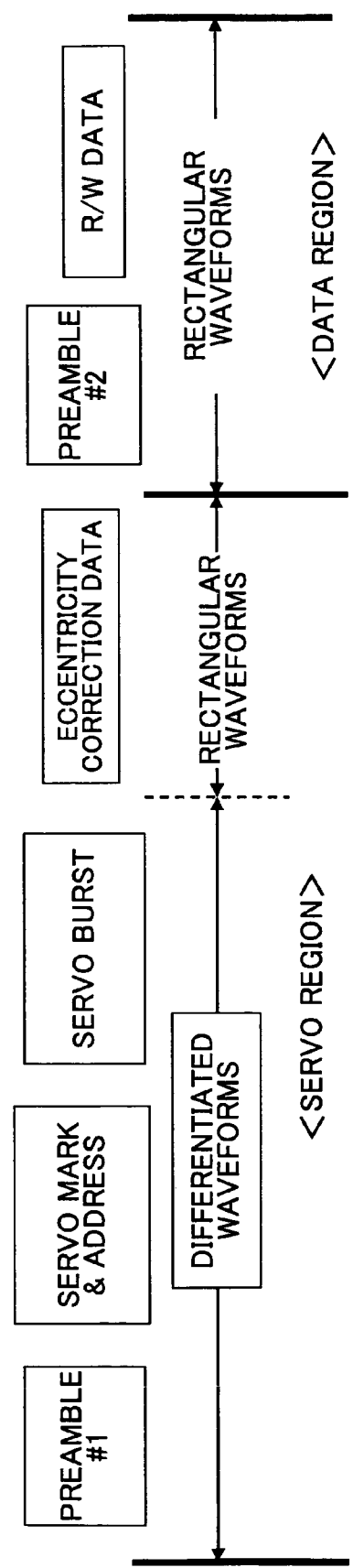
FIG. 3 is a diagram showing a format on a perpendicular magnetic disk that is recorded with servo information by a magnetic transfer that applies magnetization in an in-plane direction with respect to the perpendicular magnetic disk.
Figure 4:
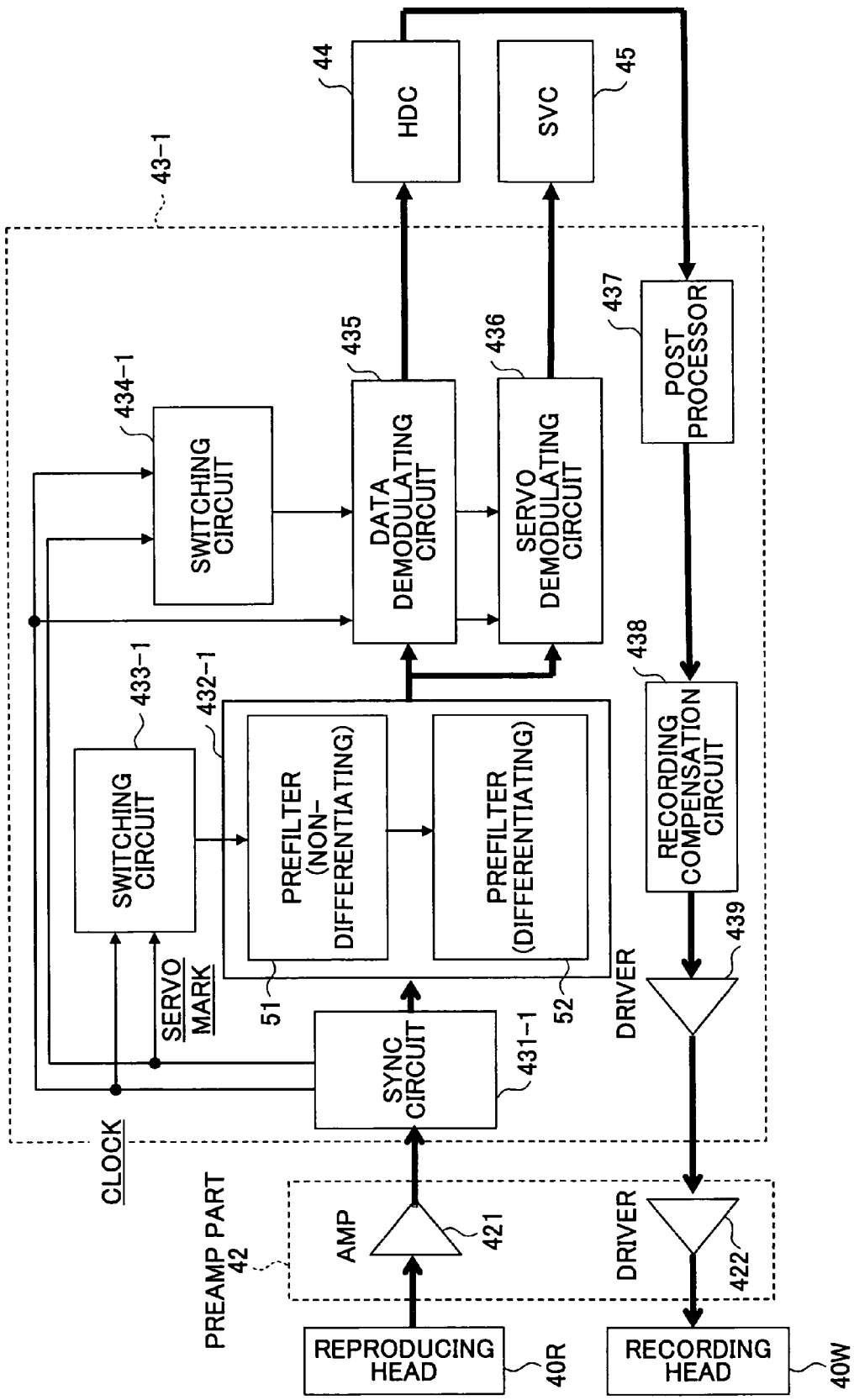
FIG. 4 is a system block diagram showing a first embodiment of a magnetic storage apparatus according to the present invention.

FIG. 4 is a system block diagram showing a first embodiment of the magnetic storage apparatus according to the present invention. This first embodiment of the magnetic storage apparatus employs a first embodiment of the signal processing circuit according to the present invention, a first embodiment of the eccentricity correction method according to the present invention, and a first embodiment of the perpendicular magnetic recording medium (having a format shown in FIG. 5) according to the present invention.

A magnetic disk drive 41-1 shown in FIG. 4 includes a reproducing head 40R, a recording head 40W, a preamplifier part 42, a read and write part 43-1, a hard disk controller (HDC) 44, and a servo controller (SVC) 45. The preamplifier part 42 includes an amplifier 421 and a driver 422. The read and write part 43-1 includes a synchronizing circuit 431-1, a prefilter part 432-1, switching circuits 433-1 and 434-1, a data demodulating circuit 435, a servo demodulating circuit 436, a post processor 437, a recording compensation circuit 438, and a driver 439. The prefilter part 432-1 includes a prefilter 51 having a non-differentiating characteristic, and a prefilter 52 having a differentiating characteristic. In this embodiment, each of the prefilters 51 and 52 is made up of a finite impulse response (FIR) filter. The signal processing circuit includes at least the prefilter part 432-1, the data demodulating circuit 435, the servo demodulating circuit 436, the HDC 44 and the SVC 45.

Figure 5:
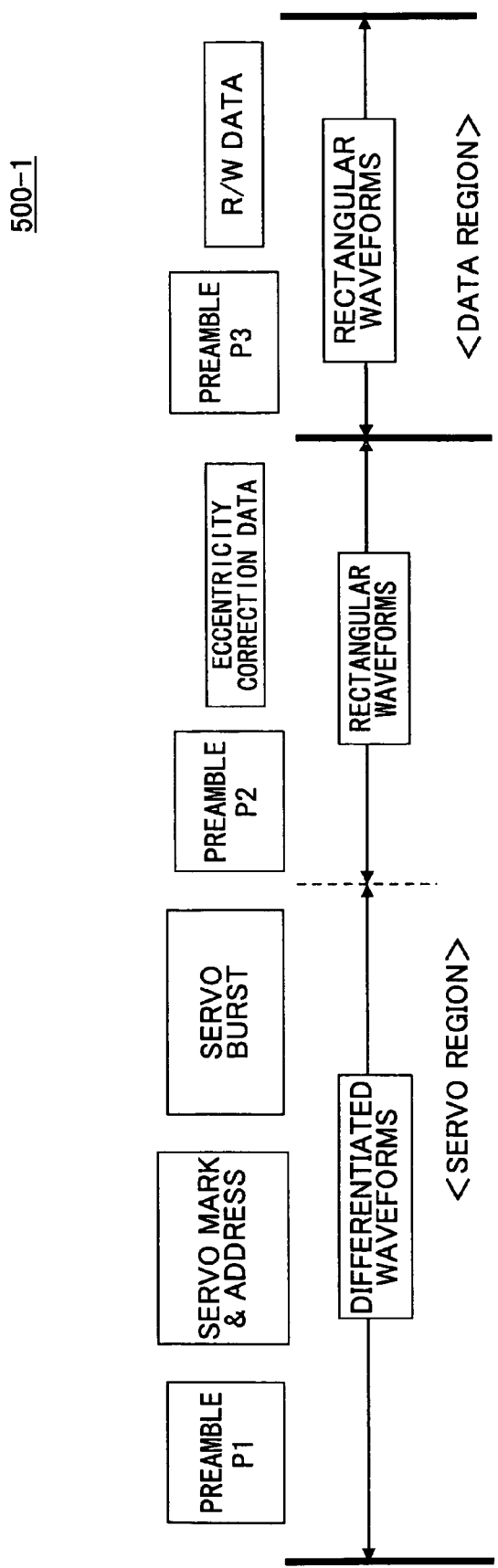
FIG. 5 is a diagram showing a format of a first embodiment of a perpendicular magnetic recording medium according to the present invention.

FIG. 5 is a diagram showing a format of the first embodiment of the perpendicular magnetic recording medium according to the present invention. A perpendicular magnetic disk 500-1 has a servo region and a data region which follows the servo region. A servo mark and address, and a servo burst are prerecorded subsequent to a preamble P1 within the servo region by a known magnetic transfer which applies a magnetization in an in-plane direction of the perpendicular magnetic disk 500-1. The perpendicular magnetic disk 500-1 after the magnetic transfer is assembled into the magnetic disk drive 41-1, and an eccentricity correction data (or a post code) is recorded within the servo region by the recording head 40W subsequent to the a preamble P2 following the servo burst within the servo region. The preamble P1 is made up of patterns having a constant period and is recorded for use in controlling read timings of the servo mark and address, and the servo burst. The preamble P2 is made up of patterns having a constant period and is recorded for use in controlling a read timing of the eccentricity correction data. The eccentricity correction data itself is a correction data that is used to carry out a known eccentricity correction, that is, a repeatable run out (RRO) correction in real-time, and is obtainable by a known method. Data are recorded subsequent to a preamble P3 within the data region which follows the servo region. In the data region, the data are recorded by the recording head 40W subsequent to the preamble P3 at the time of the recording, and the recorded data are reproduced by the reproducing head 40R at the time of the reproduction. The data that are reproduced and recorded with respect to the data region are shown as R/W (read/write) data in FIG. 5. The preamble P3 is made up of patterns having a constant period and is recorded for use in controlling a read timing of the R/W data. Since patterns of the preambles P1, P2 and P3 have mutually different frequencies, it is possible to easily distinguish the information following each of the preambles P1, P2 and P3.

Figure 6:
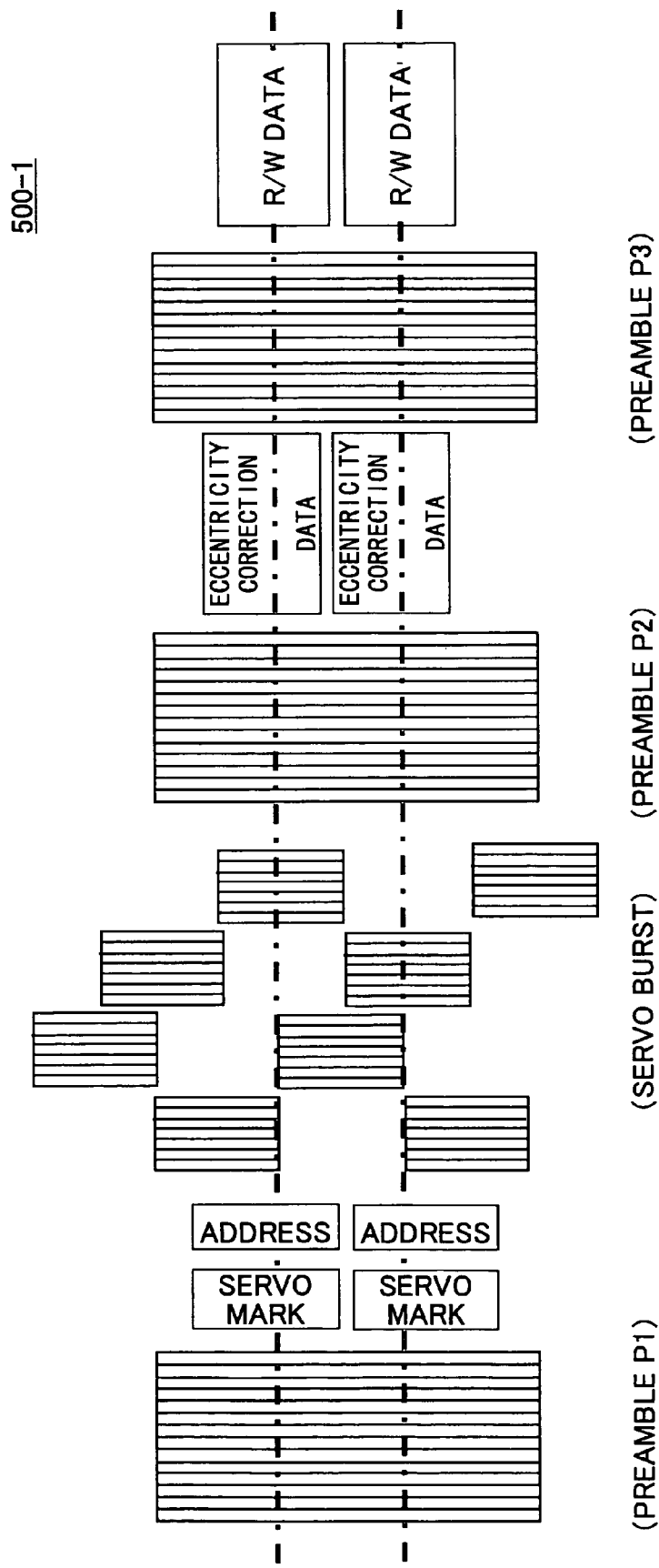
FIG. 6 is a plan view showing the format shown in FIG. 5.

FIG. 6 is a plan view showing the format shown in FIG. 5. For example, an upward direction in FIG. 6 corresponds to an inner peripheral direction of the perpendicular magnetic disk 500-1, and a downward direction in FIG. 6 corresponds to an outer peripheral direction of the perpendicular magnetic disk 500-1. In addition, one-dot chain lines in FIG. 6 indicate centerlines of two mutually adjacent tracks. The tracks are formed concentrically or, as track turns of a spiral track, on the perpendicular magnetic disk 500-1.

Figure 7:
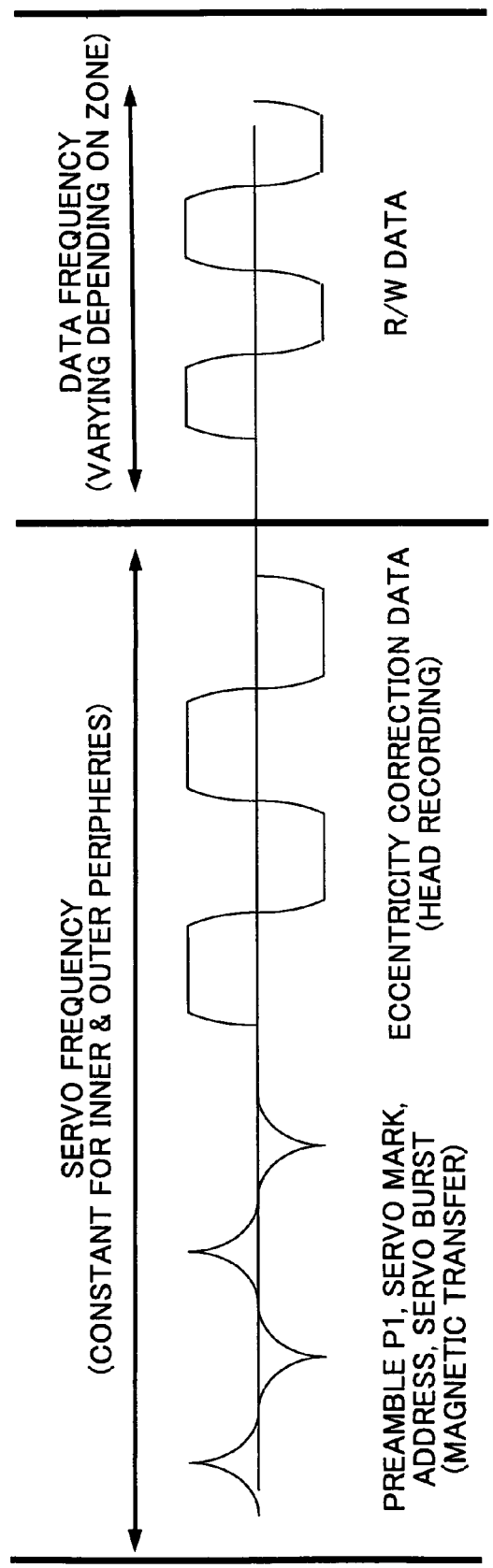
FIG. 7 is a diagram for explaining an output of a reproducing head.

FIG. 7 is a diagram for explaining an output of the reproducing head 40R. As shown in FIG. 7, the reproducing head 40R outputs differentiated waveforms when reproducing the preamble P1, the servo mark and address, and the servo burst within the servo region that are recorded by the magnetic transfer. In addition, the reproducing head 40R outputs rectangular waveforms when reproducing the preamble P2 and the eccentricity correction data within the servo region that are recorded by the recording head 40W. Furthermore, the reproducing head 40R outputs rectangular waveforms when reproducing the preamble P3 and the R/W data within the data region that are recorded by the recording head 40W. The servo information frequency (including the eccentricity correction data) within the servo region is constant for the entire region on the perpendicular magnetic disk 500-1. On the other hand, the R/W data frequency within the data region is different for each zone (or region) that is formed in a ring-shape in a radial direction of the perpendicular magnetic disk 500-1.

The information that is reproduced from the perpendicular magnetic disk 500-1 by the reproducing head 40R is supplied to the data demodulating circuit 435 and the servo demodulating circuit 436 via the amplifier 421, the synchronizing circuit 431-1 and the prefilter part 432-1. The synchronizing circuit 431-1 generates clocks CK1 through CK3 and the servo mark from the reproduced information, supplies the clocks CK1 and CK2 (or the clocks CK1 and CK3) and the servo mark to the switching circuit 433-1, and supplies the clocks CK2 and CK3 (or only the clock CK2) and the servo mark to the switching circuit 434-1. Moreover, the synchronizing circuit 431-1 supplies the clocks CK1 and CK2 to the servo demodulating circuit 436, and supplies the clock CK3 to the data demodulating circuit 435.

For example, the synchronizing circuit 431-1 generates from the patterns of the preamble P1 a clock CK1 having twice the fundamental frequency thereof, generates from the patterns of the preamble P2 a clock CK2 having twice the fundamental frequency thereof, and generates from the patterns of the preamble P3 a clock CK3 having twice the fundamental frequency thereof. The synchronizing circuit 431-1 reads the preamble P1 and the servo mark and address and the servo burst immediately after the preamble P1 within the servo region, in synchronism with the clock CK1, and reads the preamble P2 and the eccentricity correction data within the servo region in synchronism with the clock CK2. In addition, the synchronizing circuit 431-1 reads the preamble P3 and the R/W data within the data region in synchronism with the clock CK3.

The switching circuit 433-1 controls the switching of the prefilter part 432-1 so as to selectively output an output of the prefilter 51 while reading the preamble P1, the servo mark and address, and the servo burst within the servo region, based on the clock CK1 and the servo mark, and to selectively output an output of the prefilter 52 while reading the preamble P2 and the eccentricity correction data within the servo region and the preamble P3 and the R/W data within the data region, based on the clock CK2 and the servo mark. For example, a first switching signal that is output from the switching circuit 433-1 to the prefilter part 432-1 becomes active to switch the output of the prefilter part 432-1 from the output of the prefilter 51 to the output of the prefilter 52 at a timing which is m1 periods after the servo mark by counting the clock CK1 using the servo mark as a trigger, and becomes inactive to switch the output of the prefilter part 432-1 from the output of the prefilter 52 to the output of the prefilter 51 at a timing which is m2 periods after the servo mark by counting the clock CK1 using the servo mark as a trigger.

In addition, the switching circuit 434-1 controls the switching of the demodulating circuits 435 and 436 based on the clocks CK2 and CK3 (or only the clock CK2) and the servo mark, so that the output of the prefilter part 432-1 is demodulated by the servo demodulating circuit 436 while reading the servo region and the output of the prefilter part 432-1 is demodulated by the data demodulating circuit 435 while reading the data region. For example, a second switching signal that is output from the switching circuit 434-1 to the demodulating circuits 435 and 436 becomes active to make the data demodulating circuit 435 active (or to enable the data demodulating circuit 435) and the servo demodulating circuit 436 inactive (or to disable the servo demodulating circuit 436) at a timing which is n1 periods after the servo mark by counting the clock CK1 using the servo mark as a trigger, and becomes inactive to make the data demodulating circuit 435 inactive and the servo demodulating circuit 436 active at a timing which is n2 periods after the servo mark by counting the clock CK1 using the servo mark as a trigger.

When active, the servo demodulating circuit 436 demodulates the preamble P1, the servo mark and address, and the servo burst within the servo region in synchronism with the clock CK1, demodulates the preamble P2 and the eccentricity correction data within the servo region in synchronism with the clock CK2, and supplies the demodulated servo information and the demodulated eccentricity correction data to the SVC 45. The demodulated servo information and the demodulated eccentricity correction data are used for various kinds of control processes, including the eccentricity control process, in the SVC 45 which forms a servo system of the magnetic disk drive 41-1. When active, the data demodulating circuit 435 demodulates the preamble P3 and the R/W data within the data region in synchronism with the clock CK3, and supplies the demodulated R/W data to the HDC 44. The demodulated R/W data is output via the HDC 44 which forms a data processing system of the magnetic disk drive 41-1, to other parts within the magnetic disk drive 41-1 or, to the outside of the magnetic disk drive 41-1.

At the time of the recording, the recording data is supplied to the recording head 40W via the HDC 44, the post processor 437, the recording compensation circuit 438 and the drivers 439 and 422. Hence, the recording data are recorded subsequent to the preamble P3 within the data region of the perpendicular magnetic disk 500-1 by the recording head 40W.

According to this embodiment, the servo mark and address and the servo burst are prerecorded subsequent to the preamble P1 within the servo region of the perpendicular magnetic disk 500-1 by the magnetic transfer which applies the magnetization in the in-plane direction with respect to the perpendicular magnetic disk 500-1, while the eccentricity correction data within the servo region are recorded by the recording head 40W. However, it is possible to satisfactorily reproduce the servo information within the servo region that is recorded by different recording systems (or recording techniques). As a result, it is possible to simultaneously improve the SNR by the magnetic transfer which applies the magnetization in the in-plane direction and carry out a satisfactory eccentricity correction based on the eccentricity correction data.

Second Embodiment

Figure 8:
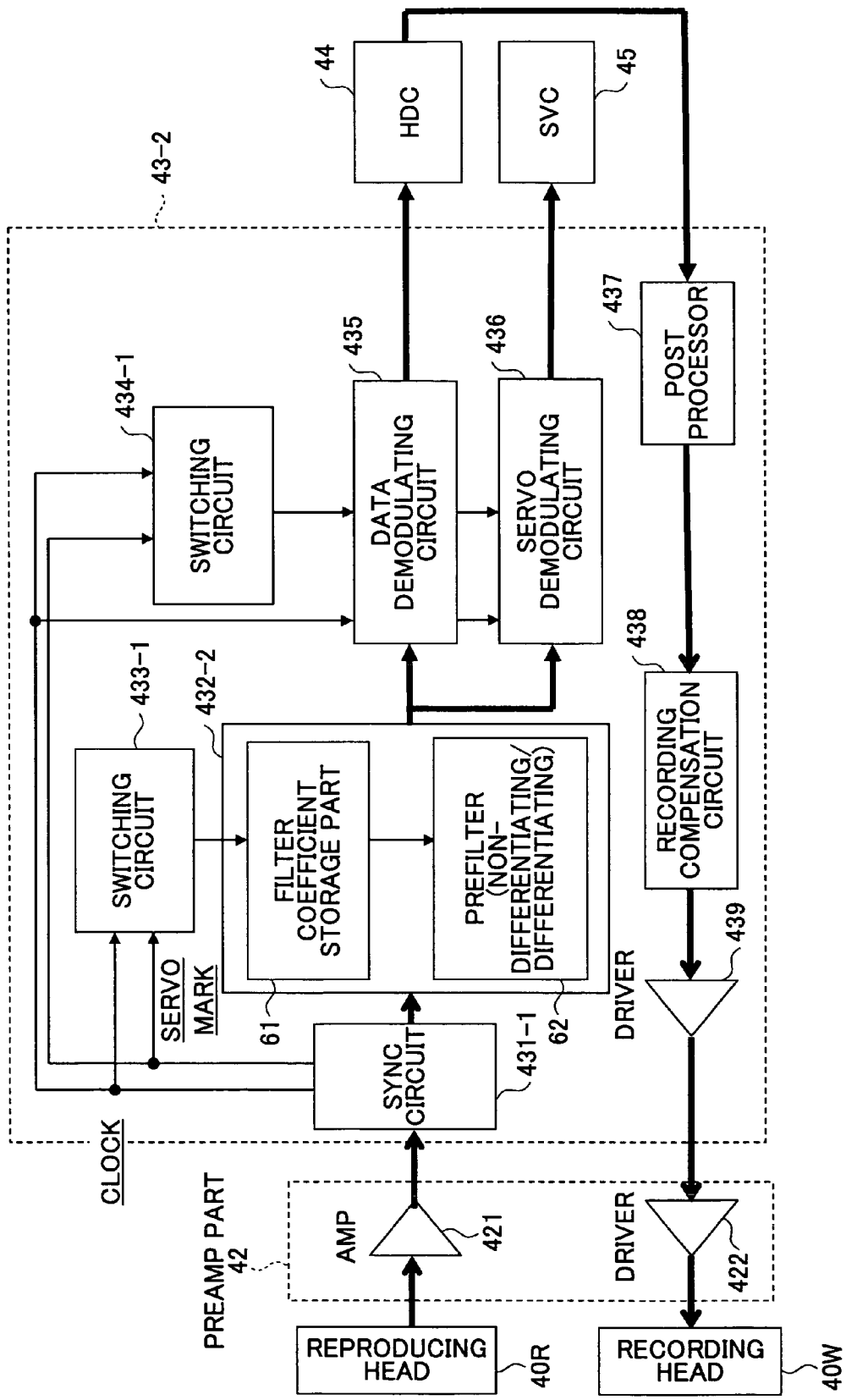
FIG. 8 is a system block diagram showing a second embodiment of the magnetic storage apparatus according to the present invention.

FIG. 8 is a system block diagram showing a second embodiment of the magnetic storage apparatus according to the present invention. This second embodiment of the magnetic storage apparatus employs a second embodiment of the signal processing circuit according to the present invention, a second embodiment of the eccentricity correction method according to the present invention, and a second embodiment of the perpendicular magnetic recording medium according to the present invention. The format of this second embodiment of the perpendicular magnetic recording medium may be the same as the format of the first embodiment shown in FIG. 5, and an illustration and description thereof will be omitted. In FIG. 8, those parts that are the same as those corresponding parts in FIG. 4 are designated by the same reference numerals, and a description thereof will be omitted. A signal processing circuit includes at least a prefilter part 432-2, a data demodulating circuit 435, a servo demodulating circuit 436, an HDC 44 and a SVC 45.

As shown in FIG. 8, a magnetic disk drive 41-2 includes a read and write part 43-2. The read and write part 43-2 has a prefilter part 432-2, and the prefilter part 432-2 has a filter coefficient storage part 61 and a prefilter 62. The filter coefficient storage part 61 stores first filter coefficients for operating the prefilter 62 as a FIR having a non-differentiating characteristic, and second filter coefficients for operating the prefilter 62 as a FIR having a differentiating characteristic. The first or second filter coefficients stored in the filter coefficient storage part 61 are set in the prefilter 62 based on the first switching signal from the switching circuit 433-1.

The switching circuit 433-1 controls the switching of the prefilter part 432-2 so as to set the first filter coefficients in the prefilter 62 while reading the preamble P1, the servo mark and address, and the servo burst within the servo region, based on the clock CK1 and the servo mark, and to set the second filter coefficients in the prefilter 62 while reading the preamble P2 and the eccentricity correction data within the servo region and the preamble P3 and the R/W data within the data region, based on the clock CK2 and the servo mark. For example, the first switching signal that is output from the switching circuit 433-1 to the prefilter part 432-2 becomes active to switch the filter coefficients that are set in the prefilter 62 from the first filter coefficients to the second filter coefficients at the timing which is m1 periods after the servo mark by counting the clock CK1 using the servo mark as a trigger, and becomes inactive to switch the filter coefficients set in the prefilter 62 from the second filter coefficients to the first filter coefficients at the timing which is m2 periods after the servo mark by counting the clock CK1 using the servo mark as a trigger. Hence, the output of the prefilter part 432-2 becomes the same as the output of the prefilter part 432-1 of the first embodiment described above.

According to this embodiment, it is possible to obtain effects similar to those obtainable in the first embodiment described above.

Third Embodiment

Figure 9:
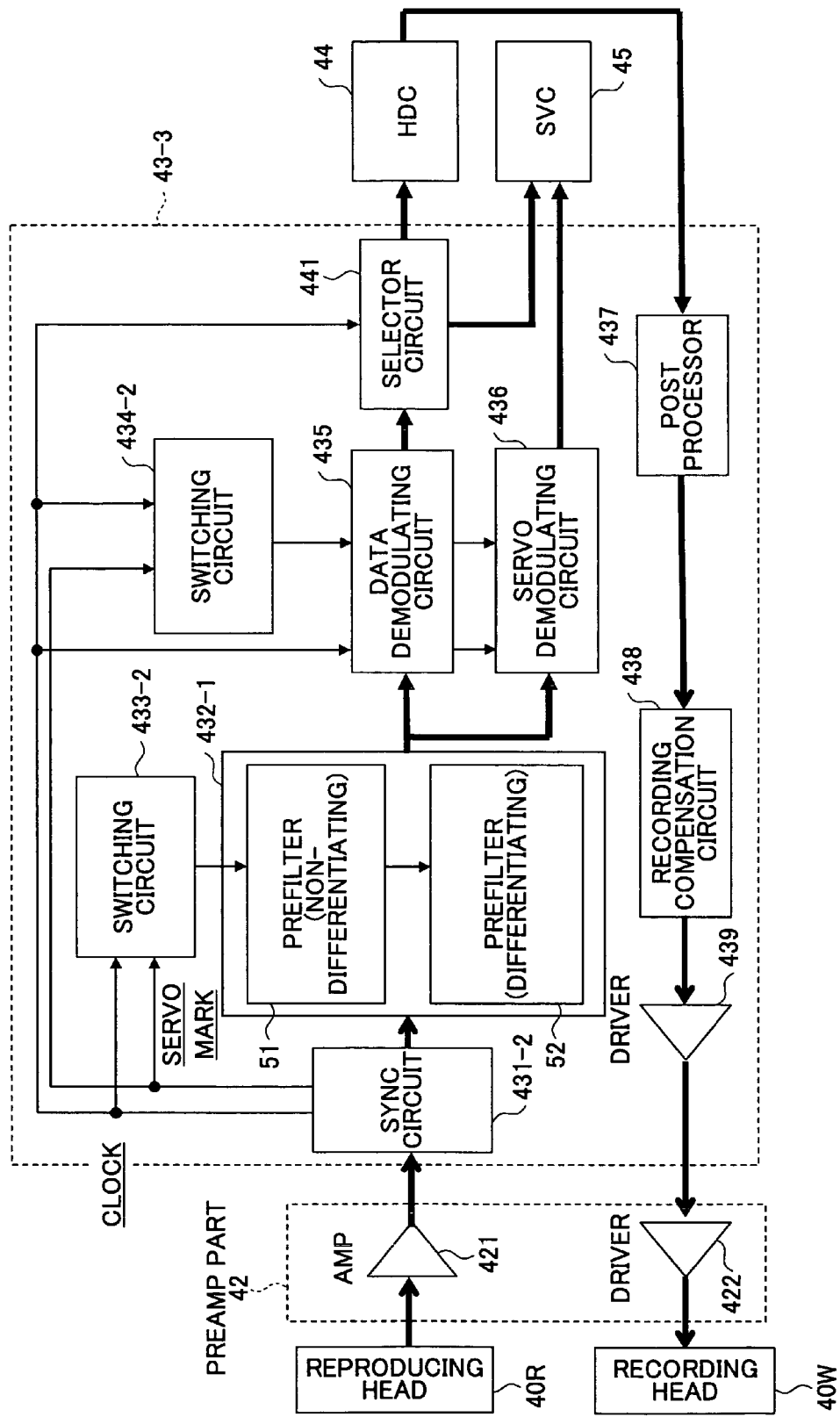
FIG. 9 is a system block diagram showing a third embodiment of the magnetic storage apparatus according to the present invention.

FIG. 9 is a system block diagram showing a third embodiment of the magnetic storage apparatus according to the present invention. This third embodiment of the magnetic storage apparatus employs a third embodiment of the signal processing circuit according to the present invention, a third embodiment of the eccentricity correction method according to the present invention, and a third embodiment of the perpendicular magnetic recording medium (having a format shown in FIG. 10) according to the present invention. In FIG. 9, those parts that are the same as those corresponding parts in FIG. 4 are designated by the same reference numerals, and a description thereof will be omitted. A signal processing circuit includes at least a prefilter part 432-1, a data demodulating circuit 435, a servo demodulating circuit 436, an HDC 44 and a SVC 45.

As shown in FIG. 9, a magnetic disk drive 41-3 includes a read and write part 43-3. The read and write part 43-3 has a synchronizing circuit 431-2, switching circuits 433-2 and 434-2, a data demodulating circuit 435, a servo demodulating circuit 436, and a selector circuit 441.

Figure 10:
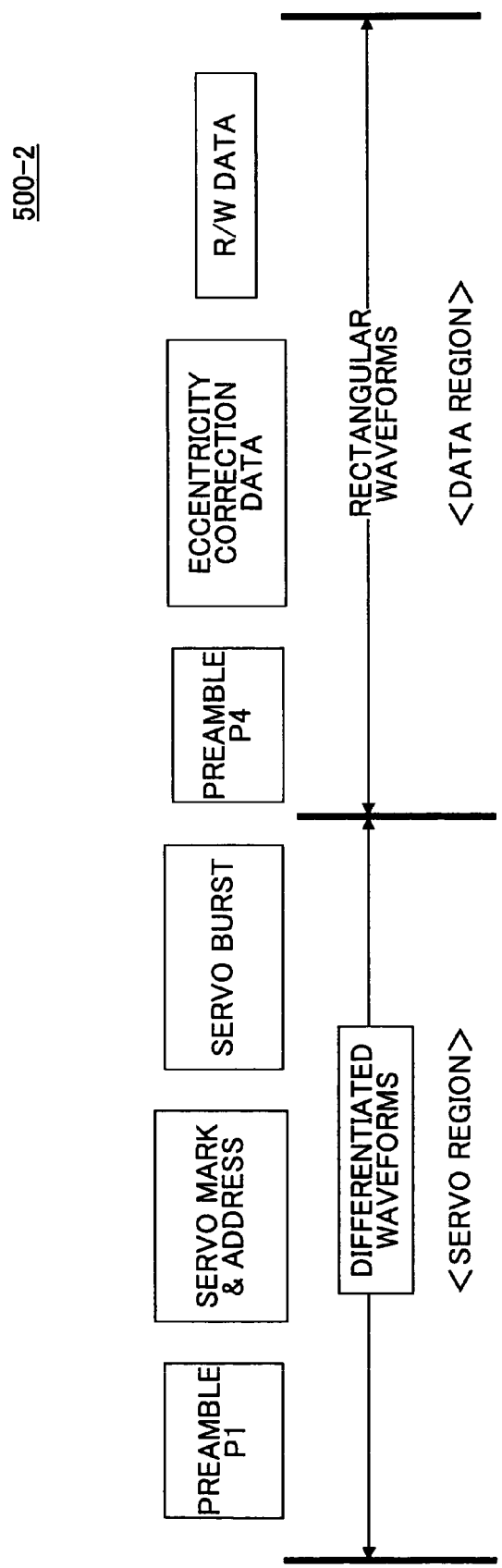
FIG. 10 is a diagram showing a format of a third embodiment of the perpendicular magnetic recording medium according to the present invention.

FIG. 10 is a diagram showing the format of the third embodiment of the perpendicular magnetic recording medium according to the present invention. A perpendicular magnetic disk 500-2 has a servo region and a data region which follows the servo region. A servo mark and address, and a servo burst are prerecorded subsequent to a preamble P1 within the servo region by a known magnetic transfer which applies a magnetization in an in-plane direction of the perpendicular magnetic disk 500-2. The perpendicular magnetic disk 500-2 after the magnetic transfer is assembled into the magnetic disk drive 41-3, and an eccentricity correction data (or a post code) is recorded within the data region by the recording head 40W subsequent to the a preamble P4 following the servo burst within the servo region. The preamble P1 is made up of patterns having a constant period and is recorded for use in controlling read timings of the servo mark and address, and the servo burst. The preamble P4 is made up of patterns having a constant period and is recorded for use in controlling read timings of the eccentricity correction data and the R/W data. The eccentricity correction data itself is a correction data that is used to carry out a known eccentricity correction, that is, an RRO correction in real-time, and is obtainable by a known method. Data are recorded in the data region subsequent to the eccentricity correction data within the data region. In the data region, the data are recorded by the recording head 40W subsequent to the eccentricity correction data at the time of the recording, and the recorded data are reproduced by the reproducing head 40R at the time of the reproduction. The data that are reproduced and recorded with respect to the data region are shown as R/W (read/write) data in FIG. 10. Since patterns of the preambles P1 and P4 have mutually different frequencies, it is possible to easily distinguish the information following each of the preambles P1 and P4.

In this case, the reproducing head 40R outputs differentiated waveforms when reproducing the preamble P1, the servo mark and address, and the servo burst within the servo region that are recorded by the magnetic transfer. In addition, the reproducing head 40R outputs rectangular waves when reproducing the preamble P4, the eccentricity data and the R/W data within the data region that are recorded by the recording head 40W.

Figure 11:
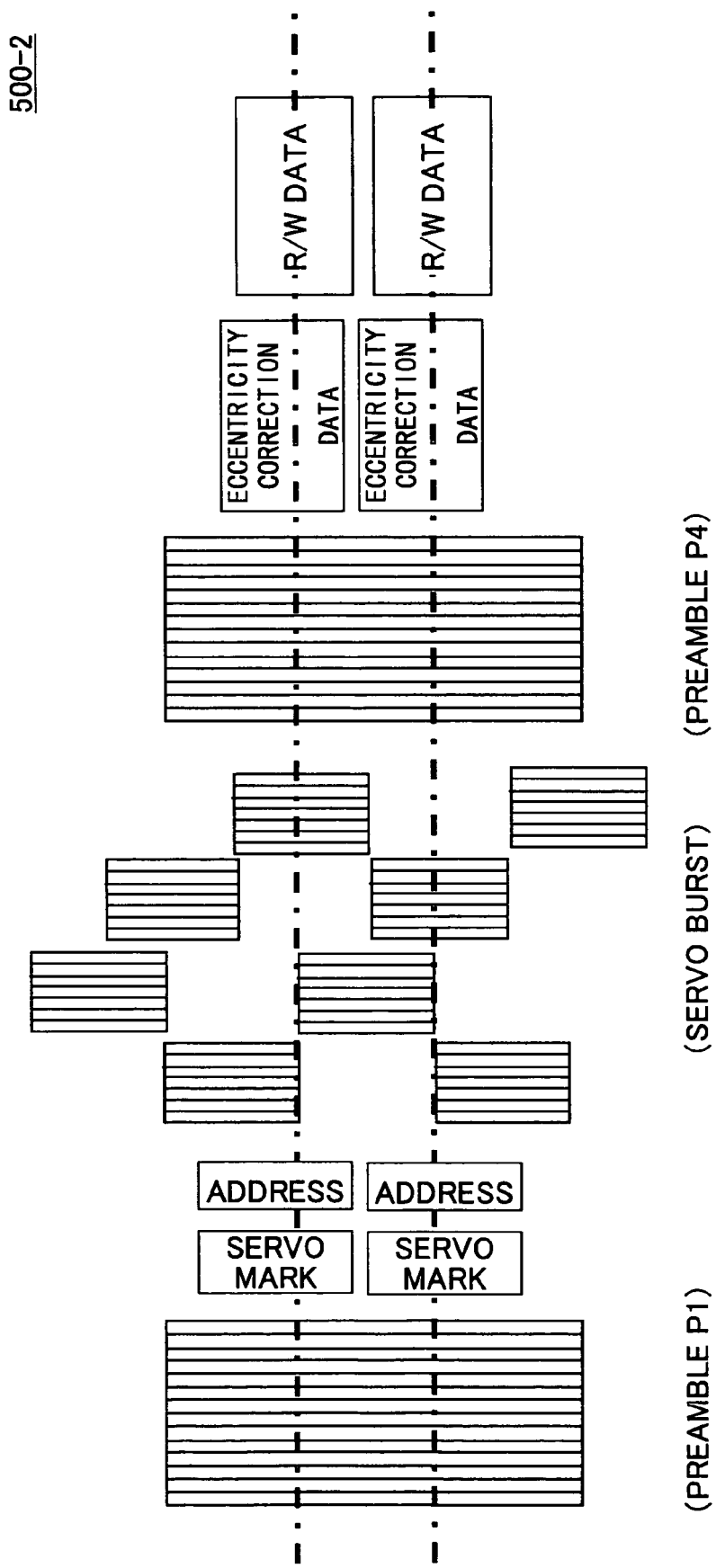
FIG. 11 is a plan view showing the format shown in FIG. 10.

FIG. 11 is a plan view showing the format shown in FIG. 10. For example, an upward direction in FIG. 11 corresponds to an inner peripheral direction of the perpendicular magnetic disk 500-2, and a downward direction in FIG. 11 corresponds to an outer peripheral direction of the perpendicular magnetic disk 500-2. In addition, one-dot chain lines in FIG. 11 indicate centerlines of two mutually adjacent tracks. The tracks are formed concentrically or, as track turns of a spiral track, on the perpendicular magnetic disk 500-2.

The R/W data frequency within the data region (including the eccentricity correction data) is different for each zone (or region) that is formed in a ring-shape in a radial direction of the perpendicular magnetic disk 500-2.

For example, the synchronizing circuit 431-2 generates from the patterns of the preamble P1 a clock CK1 having twice the fundamental frequency thereof, and generates from the patterns of the preamble P4 a clock CK4 having twice the fundamental frequency thereof. The synchronizing circuit 431-2 reads the preamble P1 and the servo mark and address and the servo burst immediately after the preamble P1 within the servo region, in synchronism with the clock CK1, and reads the preamble P4 and the eccentricity correction data and the R/W data within the data region in synchronism with the clock CK4.

The switching circuit 433-2 controls the switching of the prefilter part 432-1 so as to selectively output an output of the prefilter 51 while reading the preamble P1, the servo mark and address, and the servo burst within the servo region, based on the clock CK1 and the servo mark, and to selectively output an output of the prefilter 52 while reading the preamble P4, the eccentricity correction data and the R/W data within the data region, based on the clock CK4 and the servo mark. For example, the first switching signal that is output from the switching circuit 433-2 to the prefilter part 432-1 becomes active to switch the output of the prefilter part 432-1 from the output of the prefilter 51 to the output of the prefilter 52 at a timing which is m3 periods after the servo mark by counting the clock CK1 using the servo mark as a trigger, and becomes inactive to switch the output of the prefilter part 432-1 from the output of the prefilter 52 to the output of the prefilter 51 at a timing which is m4 periods after the servo mark by counting the clock CK1 using the servo mark as a trigger.

In addition, the switching circuit 434-2 controls the switching of the demodulating circuits 435 and 436 based on the clocks CK1 and CK4 and the servo mark, so that the output of the prefilter part 432-1 is demodulated by the servo demodulating circuit 436 while reading the servo region and the output of the prefilter part 432-1 is demodulated by the data demodulating circuit 435 while reading the data region. For example, the second switching signal that is output from the switching circuit 434-2 to the demodulating circuits 435 and 436 becomes active to make the data demodulating circuit 435 active (or to enable the data demodulating circuit 435) and the servo demodulating circuit 436 inactive (or to disable the servo demodulating circuit 436) at a timing which is n3 periods after the servo mark by counting the clock CK1 using the servo mark as a trigger, and becomes inactive to make the data demodulating circuit 435 inactive and the servo demodulating circuit 436 active at a timing which is n4 periods after the servo mark by counting the clock CK1 using the servo mark as a trigger.

The output of the data demodulating circuit 435 is supplied to the selector circuit 441. For example, the selector circuit 441 selectively outputs to the SVC 45 the output of the data demodulating circuit 435 (that is, the eccentricity correction data) from a timing which is n3 periods after the servo mark to a timing which is n5 periods after the servo mark by counting the clock CK1 using the servo mark from the synchronizing circuit 431-2 as a trigger, and selectively outputs to the HDC 44 the output of the data demodulating circuit 435 (that is, the R/W data) from a timing which is n5 periods after the servo mark to a timing which is n4 periods after the servo mark. Hence, the demodulated R/W data from the data demodulating circuit 435 are supplied to the HDC 44, and the demodulated servo information (servo mark and address, and servo burst) from the servo demodulating circuit 436 and the demodulated eccentricity correction data from the data demodulating circuit 435 are supplied to the SVC 45.

According to this embodiment, it is possible to obtain effects similar to those obtainable in the first embodiment described above. In addition, since the common preamble P4 is used to identify the eccentricity correction data and the R/W data in the case of the perpendicular magnetic disk 500-2, it is possible to improve the format efficiency compared to that of the perpendicular magnetic disk 500-1.

Fourth Embodiment

Figure 12:
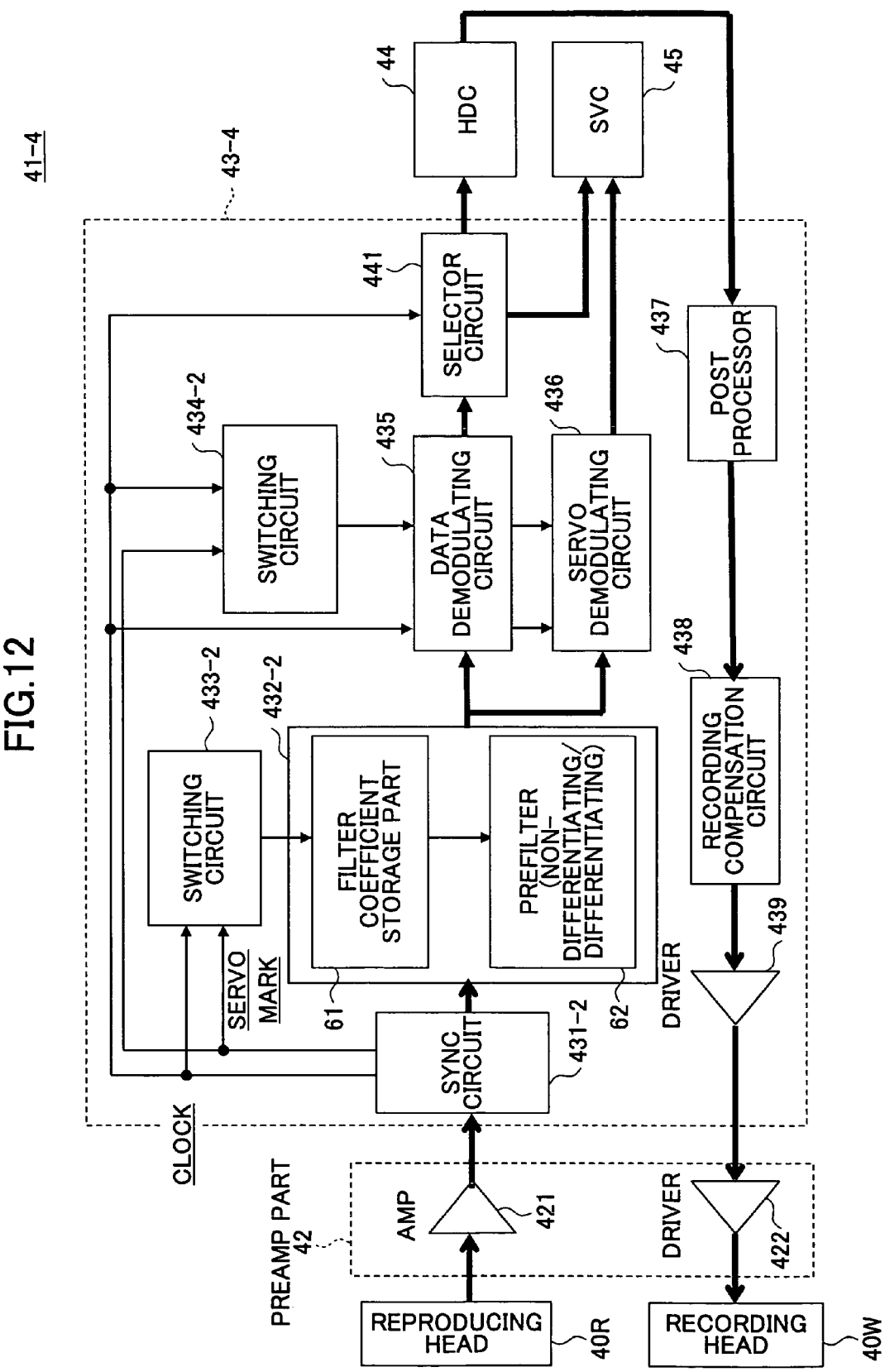
FIG. 12 is a system block diagram showing a fourth embodiment of the magnetic storage apparatus according to the present invention.

FIG. 12 is a system block diagram showing a fourth embodiment of the magnetic storage apparatus according to the present invention. This fourth embodiment of the magnetic storage apparatus employs a fourth embodiment of the signal processing circuit according to the present invention, a fourth embodiment of the eccentricity correction method according to the present invention, and a fourth embodiment of the perpendicular magnetic recording medium according to the present invention. The format of this fourth embodiment of the perpendicular magnetic recording medium may be the same as the format of the third embodiment shown in FIG. 10, and an illustration and description thereof will be omitted. In FIG. 12, those parts that are the same as those corresponding parts in FIGS. 8 and 9 are designated by the same reference numerals, and a description thereof will be omitted. A signal processing circuit includes at least a prefilter part 432-2, a data demodulating circuit 435, a servo demodulating circuit 436, an HDC 44 and a SVC 45.

The switching circuit 433-2 controls the switching of the prefilter part 432-2 so as to set the first filter coefficients in the prefilter 62 while reading the preamble P1, the servo mark and address, and the servo burst within the servo region, based on the clock CK1 and the servo mark, and to set the second filter coefficients in the prefilter 62 while reading the preamble P4, the eccentricity correction data and the R/W data within the data region, based on the clock CK4 and the servo mark. For example, the first switching signal that is output from the switching circuit 433-2 to the prefilter part 432-2 becomes active to switch the filter coefficients that are set in the prefilter 62 from the first filter coefficients to the second filter coefficients at the timing which is m3 periods after the servo mark by counting the clock CK1 using the servo mark as a trigger, and becomes inactive to switch the filter coefficients set in the prefilter 62 from the second filter coefficients to the first filter coefficients at the timing which is m4 periods after the servo mark by counting the clock CK1 using the servo mark as a trigger.

According to this embodiment, it is possible to obtain effects similar to those obtainable in the first embodiment described above. In addition, since the common preamble P4 is used to identify the eccentricity correction data and the R/W data in the case of the perpendicular magnetic disk 500-2, it is possible to improve the format efficiency compared to that of the perpendicular magnetic disk 500-1.

Fifth Embodiment

Figure 13:
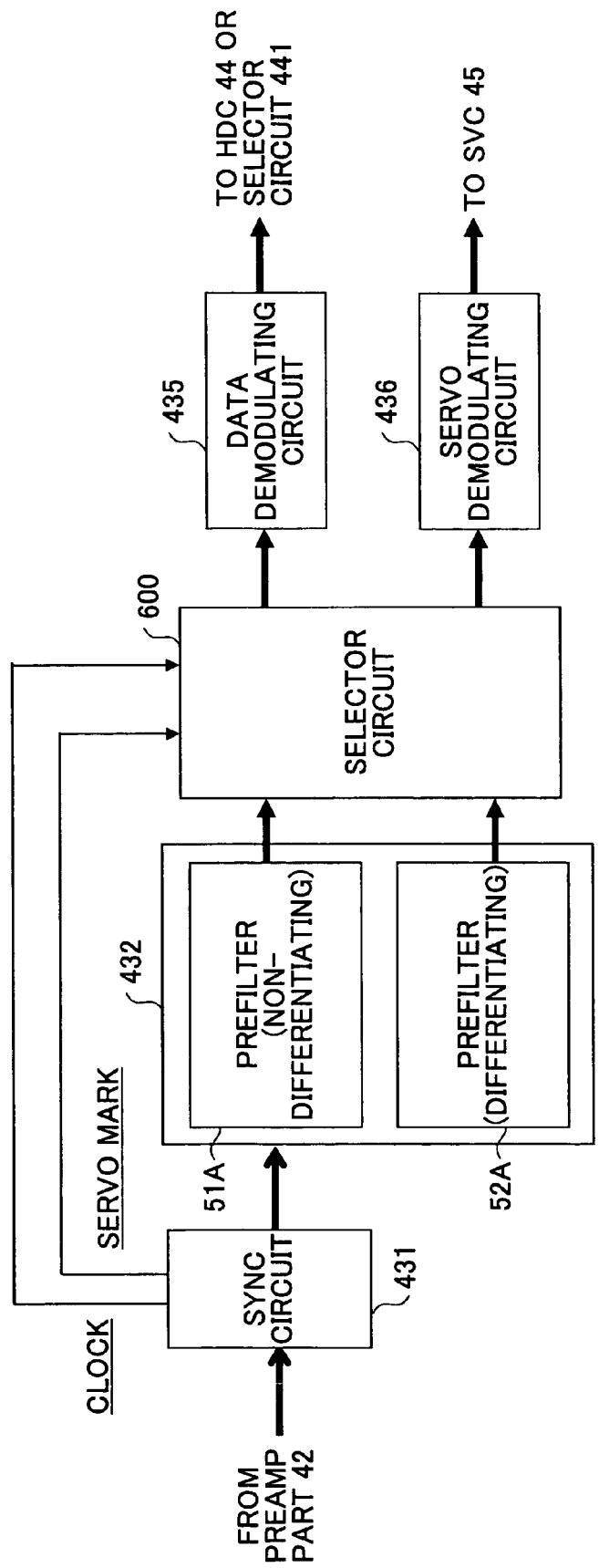
FIG. 13 is a system block diagram showing a fifth embodiment of the magnetic storage apparatus according to the present invention.

FIG. 13 is a system block diagram showing a fifth embodiment of the magnetic storage apparatus according to the present invention. This fifth embodiment of the magnetic storage apparatus employs a fifth embodiment of the signal processing circuit according to the present invention, a fifth embodiment of the eccentricity correction method according to the present invention, and a fifth embodiment of the perpendicular magnetic recording medium according to the present invention. The format of this fifth embodiment of the perpendicular magnetic recording medium may be the same as the format of the first embodiment shown in FIG. 5 or, the format of the third embodiment shown in FIG. 10, and an illustration and description thereof will be omitted. A signal processing circuit includes at least a prefilter part 432, a data demodulating circuit 435, a servo demodulating circuit 436, an HDC 44 and a SVC 45.

FIG. 13 only shows an important part of the fifth embodiment of the magnetic storage apparatus. In FIG. 13, those parts that are the same as those corresponding parts in FIG. 4 are designated by the same reference numerals, and a description thereof will be omitted. As shown in FIG. 13, in a read and write part 43-5 of a magnetic disk drive 41-5, the prefilter part 432 constantly supplies an output of a synchronizing circuit 431 to a selector circuit 600 via prefilters 51A and 51B. The prefilter 51A has a non-differentiating filter characteristic, and the prefilter 52A has a differentiating filter characteristic. The selector circuit 600 inputs one of outputs of the prefilters 51A and 52A at a timing based on the clocks CK1 through CK3 from the synchronizing circuit 431, and selectively outputs the one of the outputs input to the selector circuit 600 to one of the data demodulating circuit 435 and the servo demodulating circuit 436.

In the case where the fifth embodiment of the perpendicular magnetic recording medium uses the same format as the first embodiment, the perpendicular magnetic disk 500-1 has the format shown in FIG. 5. In this case, the input of the selector circuit 600 is switched and controlled so as to selectively input the output of the prefilter 51A while reading the preamble P1, the servo mark and address, and the servo burst within the servo region, based on the clock CK1 and the servo mark from the synchronizing circuit 431, and to selectively input the output of the prefilter 52A while reading the preamble P2 and the eccentricity correction data within the servo region and the preamble P3 and the R/W data within the data region, based on the clock CK2 and the servo mark from the synchronizing circuit 431. In addition, the output of the selector circuit 600 is switched and controlled so as to selectively output the output of the prefilter part 432 to the servo demodulating circuit 436 while reading the servo region, and to selectively output the output of the prefilter part 432 to the data demodulating circuit 435 while reading the data region, based on the clocks CK1 through CK3 and the servo mark from the synchronizing circuit 431.

On the other hand, in the case where the fifth embodiment of the perpendicular magnetic recording medium uses the same format as the third embodiment, the perpendicular magnetic disk 500-2 has the format shown in FIG. 10. In this case, the input of the selector circuit 600 is switched and controlled so as to selectively input the output of the prefilter 51A while reading the preamble P1, the servo mark and address, and the servo burst within the servo region, based on the clock CK1 and the servo mark from the synchronizing circuit 431, and to selectively input the output of the prefilter 52A while reading the preamble P4, the eccentricity correction data within the servo region and the R/W data within the data region, based on the clock CK4 and the servo mark from the synchronizing circuit 431. In addition, the output of the selector circuit 600 is switched and controlled so as to selectively output the output of the prefilter part 432 to the servo demodulating circuit 436 while reading the servo region, and to selectively output the output of the prefilter part 432 to the data demodulating circuit 435 while reading the data region, based on the clocks CK1 and CK4 and the servo mark from the synchronizing circuit 431.

According to this embodiment, it is possible to obtain effects similar to those obtainable in the first or third embodiment described above. Furthermore, because the selection of the outputs of the prefilters 51A and 52A within the prefilter part 432 and the selection of the demodulating circuits 435 and 436 to which the output of the prefilter part 432 is to be input are made using the single selector circuit 600, it is unnecessary to provide a mechanism for controlling the demodulating circuits 435 and 436 to the active or inactive states (or to enable or disable the demodulating circuits 435 and 436), it is possible to simplify the circuit structure.

In each of the embodiments described above, the various timings are generated by counting the clock CK1. However, it is of course possible to generate the various timings by counting clocks other than the clock CK1.

In addition, although the present invention is applied to the perpendicular magnetic disk in the described embodiments, the present invention is of course applicable to perpendicular magnetic recording media other than the perpendicular magnetic disk. For example, the perpendicular magnetic recording medium may have a card shape, and the card-shaped perpendicular magnetic recording medium may have concentric tracks or a spiral track formed thereon.

This application claims the benefit of a Japanese Patent Application No. 2006-080580 filed Mar. 23, 2006, in the Japanese Patent Office, the disclosure of which is hereby incorporated by reference.

Further, the present invention is not limited to these embodiments, but various variations and modifications may be made without departing from the scope of the present invention.

What is claimed is:

1. An eccentricity correction method comprising:
   reproducing information from a perpendicular magnetic recording medium that is recorded with servo information, eccentricity correction data and read/write data, by a reproducing head;
   filtering a reproduced output of the reproducing head, by filtering the servo information which has a differentiated waveform by a non-differentiating filter characteristic, and by filtering the eccentricity correction data and the read/write data which have rectangular waveforms by a differentiating filter characteristic;
   demodulating the servo information, the eccentricity correction data and the read/write data that are filtered by the filtering;
   outputting the demodulated servo information and eccentricity correction data to a servo system which carries out a control process including an eccentricity correction, and the demodulated read/write data to a data processing system;
   wherein the perpendicular magnetic recording medium has a servo region and a data region, the servo region is recorded with a first preamble, the servo information, a second preamble and the eccentricity correction data, and the data region is recorded with a third preamble and the read/write data, and
   generating first through third clocks and a servo mark from patterns of the first through third preambles having a constant period and mutually different frequencies, from the reproduced output of the reproducing head,
   wherein the filtering filters the reproduced output by the non-differentiating filter characteristic while reading the first preamble, the servo mark and address, and a servo burst within the servo region, based on the first clock and the servo mark, and filters the reproduced output by the differentiating filter characteristic while reading the second preamble and the eccentricity correction data within the servo region and the third preamble and the read/write data within the data region, based on the second clock and the servo mark.

2. The eccentricity correction method as claimed in claim 1, wherein the outputting outputs the reproduced output that is demodulated to the servo system while reading the servo region, and outputs the reproduced output that is demodulated to the data processing system while reading the data region, based on the first through third clocks and the servo mark.

3. The eccentricity correction method as claimed in claim 1, wherein each information within the servo region has a constant frequency regardless of a region on the perpendicular magnetic recording medium, and each information within the data region has a different frequency for each region on the perpendicular magnetic recording medium.

4. An eccentricity correction method comprising:

reproducing information from a perpendicular magnetic recording medium that is recorded with servo information, eccentricity correction data and read/write data, by a reproducing head;

filtering a reproduced output of the reproducing head, by filtering the servo information which has a differentiated waveform by a non-differentiating filter characteristic, and by filtering the eccentricity correction data and the read/write data which have rectangular waveforms by a differentiating filter characteristic;

demodulating the servo information, the eccentricity correction data and the read/write data that are filtered by the filtering;

outputting the demodulated servo information and eccentricity correction data to a servo system which carries out a control process including an eccentricity correction, and the demodulated read/write data to a data processing system;

wherein the perpendicular magnetic recording medium has a servo region and a data region, the servo region is recorded with a first preamble and the servo information, and the data region is recorded with a second preamble, the eccentricity correction data and the read/write data, and generating first and second clocks and a servo mark from patterns of the first and second preambles having a constant period and mutually different frequencies, from the reproduced output of the reproducing head, wherein the filtering filters the reproduced output by the non-differentiating filter characteristic while reading the first preamble, the servo mark and address, and a servo burst within the servo region, based on the first clock and the servo mark, and filters the reproduced output by the differentiating filter characteristic while reading the second preamble, the eccentricity correction data and the read/write data within the data region, based on the second clock and the servo mark.

5. The eccentricity correction method as claimed in claim 4, wherein the outputting outputs the reproduced output that is demodulated to the servo system while reading the servo region and the eccentricity correction data within the data region, and outputs the reproduced output that is demodulated to the data processing system while reading the data region, based on the first and second clocks and the servo mark.

* * * * *